May 1, 1928.
H. B. HICKMAN
1,668,149
APPARATUS FOR GAUGING TEMPERATURE OF GASOLINE IN TANK CARS
Filed March 25, 1926 2 Sheets-Sheet 1
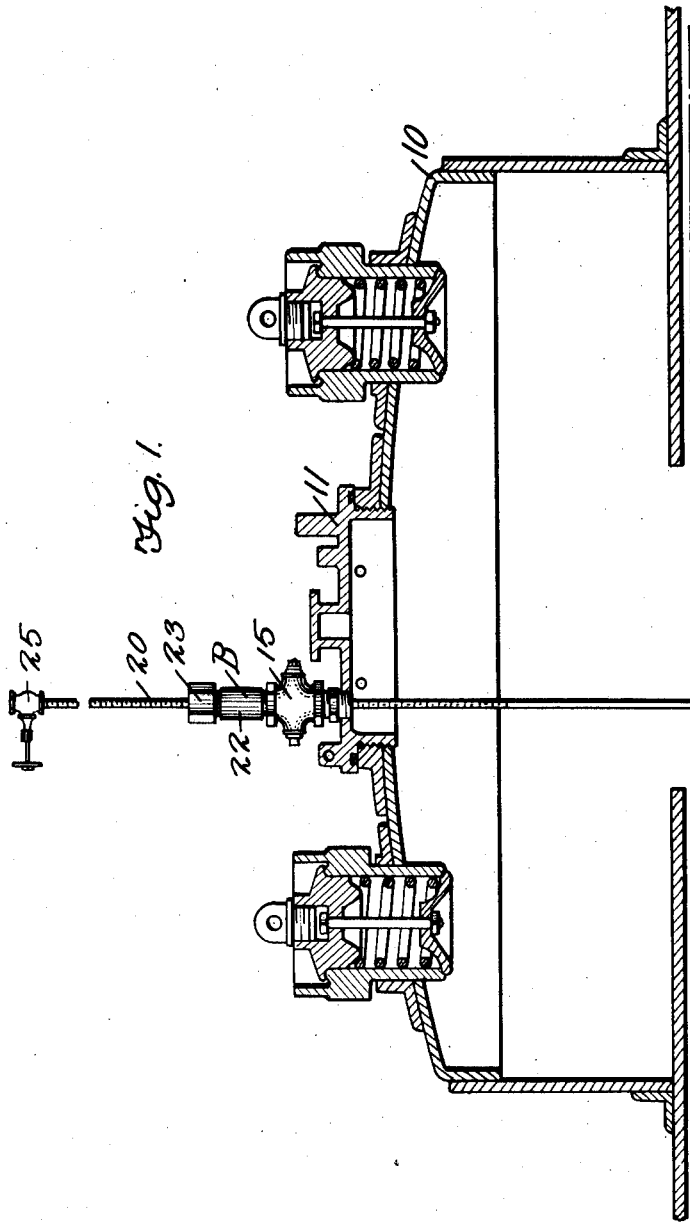
Harry B. Hickman, INVENTOR.

May 1, 1928. 1,668,149
H. B. HICKMAN
APPARATUS FOR GAUGING TEMPERATURE OF GASOLINE IN TANK CARS
Filed March 25, 1926   2 Sheets-Sheet 2
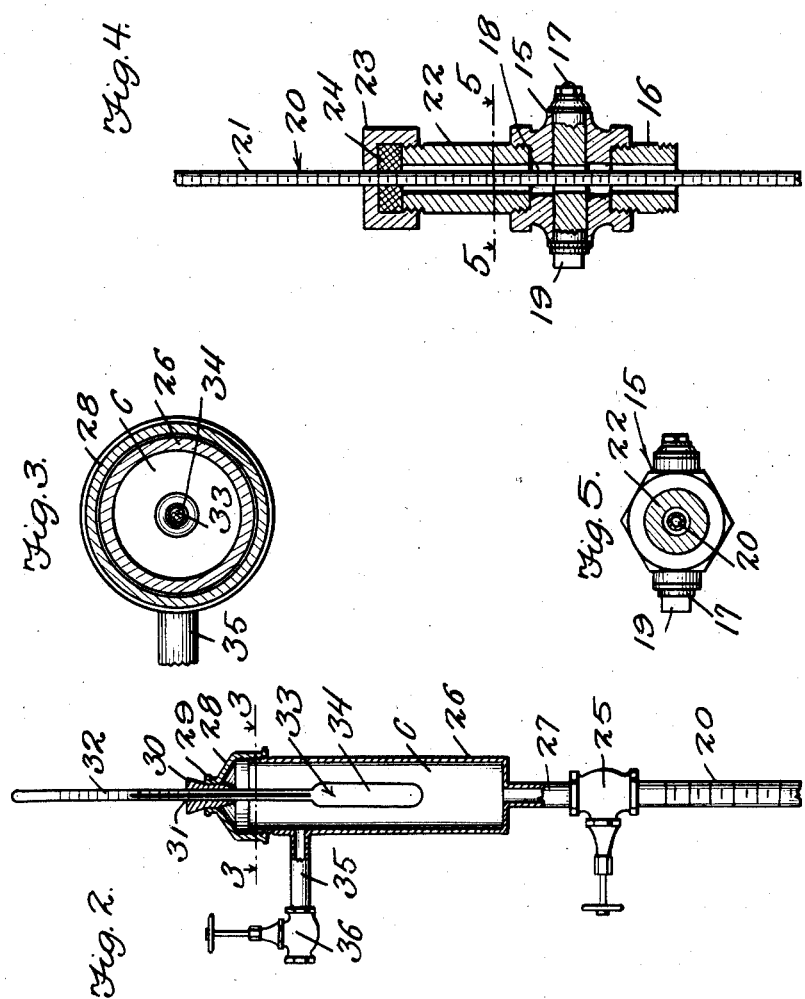
Harry B. Hickman,
INVENTOR.

Patented May 1, 1928.

1,668,149

UNITED STATES PATENT OFFICE.

HARRY B. HICKMAN, OF EASTLAND, TEXAS.

APPARATUS FOR GAUGING TEMPERATURE OF GASOLINE IN TANK CARS.

Application filed March 25, 1926. Serial No. 97,406.

This invention appertains to novel means for the testing and gauging of gasoline and other volatile fluids in tanks and more particularly to novel means for gauging and taking the temperature of gasoline in tank cars after the filling of such cars and preparatory to the unloading of such cars.

The primary object of this invention is the provision of novel means for gauging the height of a liquid in a tank car without the necessity of removing the filling cover of such car and thereby avoid the loss of the vapors collected in the tank and other contingents incident to the removal of such cover.

A further object of the invention is the provision of novel means for accurately determining the true temperature of a liquid contained in the center of the tank without necessitating the removal of the said filling cover.

A further object of the invention is the provision of a novel method of gauging the height of gasoline in a tank car and testing the temperature thereof consisting of the use of a hollow gauge rod and a valve connected with the tank, through which the rod is adapted to be inserted, the point of contact of the rod with the liquid being determined upon the rising of the liquid in the hollow tube by the pressure of the gas in the car and then pushing the rod a relatively great distance into the gasoline after the gauging thereof and the attaching to said rod of an auxiliary chamber in which the gasoline is allowed to flow and in which is positioned a suitable thermometer.

A still further object of the invention is to provide a novel apparatus for testing the height and temperature of gasoline in tank cars of the above character which embodies merely the use of a valve for connection with the dome of the tank car and a gauge rod attachment and thermometer attachment for successive use on all of the tank cars.

A still further object of the invention is to provide an improved device of the above character, which will be durable and efficient in use, one that will be simple and easy to manufacture and one which can be placed upon the market at a reasonable cost.

With these and other objects in view, the invention consists in the novel construction, arrangement and formation of parts, as will be hereinafter more specifically described, claimed and illustrated in the accompanying drawings, in which drawings:

Figure 1 is a vertical section through the upper end of a railroad tank car and filling dome showing the improved attachment connected therewith engaging the gasoline contained therein.

Figure 2 is a vertical section through the attachment for use in conjunction with the gauge rod for determining the temperature of the gasoline contained in the tank.

Figure 3 is a detail horizontal section through said temperature determining means taken on the line 3—3 of Figure 2.

Figure 4 is a detail section showing the means of associating the gauge rod with the valve carried by the tank car.

Figure 5 is a detail section taken on the line 5—5 of Figure 4.

Referring to the drawings in detail, wherein similar reference characters designate corresponding parts throughout the several views, the letter A generally indicates the usual type of tank car provided with a dome 10 having the usual removable filling cover 11. As stated the car A with the dome 10 and cover 11 are of the usual construction.

The letter B generally indicates the improved device for gauging the gasoline in the car and C the novel means for testing the temperature of the gasoline in the car for use in conjunction with said gauge means B.

The novel gauge means B comprises first a valve 15 which is connected by means of a nipple 16 with the cover 11, so that the valve will have communication with the interior of said tank car A. While I have shown the valve carried by the cover 11, it is to be understood that the same can be associated with any other preferred part of the tank car, providing the same is at the upper end thereof. The valve 15 can be of any desired type and includes the rotatable valve plug 17 having the diametrically extending passageway 18 therethrough. Any preferred type of handle can be provided for the valve plug or the outer end of the same can be provided with a polygonal extension 19 for permitting the engagement thereof by the use of a suitable key or wrench (not shown). It can be seen that when the valve is associated with the cover and the plug is turned so as to close the way through the valve, that the escape of the vapor which collects in the top of the car will be prevented from escaping from the car. Adapted to be detachably associated with the valve 15 is the novel gauge for the liquid in the said tank car, which includes a gauge rod 20 of hollow construction and the exterior thereof is provided with suitable graduations 21. This hollow graduated rod is slidably associated with a nipple 22, which can consist of a short length of pipe. The nipple 22 is adapted to be threaded into the upper end of the casing of the valve 15 and associated with the upper end of said nipple is a threaded cap 23 for the reception of a suitable packing 24, which is adapted to be compressed about said gauge rod by the cap to prevent the escape of vapors past the cap and gauge rod. If preferred a plug (not shown) can be detachably connected with the upper end of the valve casing, but the plug is not a necessity, as the valve itself will form a closure for the said tank. Connected with the extreme upper end of the gauge rod 20 is a valve 25 which can be of the globe type for controlling the flow of liquid through the gauge rod as will be now described.

When it is desired to gauge the height of the liquid in a tank car, it is merely necessary to associate the nipple 22 with the valve and pull the gauge rod 20 to its extreme uppermost position after which the valve plug 17 is turned so as to aline the way 18 therein with the nipple and the rod is then slipped through the way 18 until the rod touches the liquid. The point of contact at the lower end of the rod with the liquid is found, in view of the fact that as soon as the rod comes in contact with the liquid, the liquid will be forced through the rod by the pressure of the gas in said tank car. The reading of the gauge rod is now taken relative to the cap 23 and the exact height can be determined by subtracting the known distance between the top of the car and the cap. As soon as the liquid starts flowing through the valve 25 the same is shut off so as to prevent all loss from the gasoline.

The novel means C employed for determining the temperature of the liquid in the central part of the tank comprises a chamber or casing 26 having a depending nipple 27 which is threaded into the valve casing 25. The upper end of the chamber or casing 26 is provided with a detachable cap 28 having a reduced neck 29. This neck 29 is adapted to receive a compressible stopper 30 preferably formed of rubber having an axial way 31. The graduated stem 32 of a thermometer 33 is adapted to be inserted through said axial way and the bulb 34 is then placed in the chamber or casing 26, as can be readily seen by referring to Figure 2 of the drawings. The chamber 26 adjacent to the upper end thereof is provided with a laterally extending outlet pipe 35 which is also provided with a globe valve 36 for controlling the flow of the gasoline therethrough. In use of the improved temperature taking device, the chamber or casing 26 is associated with the valve 25 as described and the gauge rod is connected with the valve 15, as has been brought out above, and the rod is moved to its extreme lowermost position so that the lower end thereof will be sufficiently adjacent to the intermediate part of the liquid. The valves 25 and 36 are now open so as to permit the flow of gasoline through the chamber 26 by the natural pressure of the gas contained in the tank. Gasoline is allowed to flow freely until the reading of the thermometer remains constant after which the reading can be taken. This allows an accurate reading of the temperature from the exterior of the car without the necessity of providing complicated mechanism permanently attached to the car.

From the foregoing description, it can be seen that I have provided an exceptionally simple and durable means for detachable association with a tank car for accurately determining the height of the liquid in the car and the actual temperature thereof.

Changes in details may be made without departing from the spirit or scope of this invention, but:

What I claim as new is:

1. The combination with a tank, of means for testing the temperature of the liquid in the tank including a hollow slide rod adapted to be inserted in the upper end of said tank, and into the liquid contained therein, a casing connected with the upper end of said rod, and a thermometer having a portion thereof disposed in said casing.

2. The combination with a tank, of means for determining the temperature of the liquid within the tank from the exterior thereof embodying a hollow slide rod adapted to be inserted within said tank and into the liquid contained therein, a hollow casing carried by said rod into which the liquid is adapted to mount by the pressure of the gas within said tank, and a thermometer associated with said casing.

3. The combination with a tank car having a dome, of means for accurately determining the temperature of the liquid in the car from the exterior thereof including a valve connected with said dome, a hollow rod slidably mounted through said valve for engaging the liquid in said tank, a control valve carried by the rod adjacent to the upper end thereof, a casing connected with the upper end of the gauge rod into which the liquid is adapted to be raised by the pressure of the gas within the tank, an outlet pipe carired by said casing adjacent to the upper end thereof, means for controlling the flow of liquid through said outlet pipe and a thermometer arranged in said casing.

4. The combination with a tank car having a dome, a valve connected with the dome, of means for determining the temperature of the liquid within the tank embodying a rod slidably mounted through the valve for insertion into said liquid having an axial bore therethrough, means for controlling the flow of liquid through the gauge rod, a casing connected with the upper end of said rod having a detachable cap provided with a reduced neck, a compressible stopper mounted in said neck having an axial way therethrough, a thermometer including a bulb adapted to be positioned in the casing and a graduated tube arranged in said way of the stopper, and means for permitting the flow of liquid from said casing.

5. The combination with a tank car having a dome, of means for gauging the liquid in the car and determining the temperature thereof including a valve permanently connected with said dome, a nipple detachably secured to said valve, a gauge hollow rod slidable through the nipple and the valve for insertion into the liquid, means for controlling the flow of liquid through the hollow rod, a casing connected with the upper end of the gauge rod, a thermometer in said casing and means for controlling the flow of liquid from said casing.

6. An attachment for gauging the height of the liquid in the tank and the temperature thereof including a nipple for detachable connection with a tank, a graduated hollow rod slidably mounted within said nipple, a valve for controlling the flow of the liquid through the hollow rod, a casing connected with the upper end of said rod, a thermometer in the casing, an outlet pipe communicating with the casing adjacent to the upper end thereof, a valve for controlling the flow of liquid to said outlet pipe.

In testimony whereof I affix my signature.

HARRY B. HICKMAN.